Feb. 22, 1949.   T. J. LEHANE ET AL   2,462,514
APPARATUS FOR THE CONTROL OF COOLING SYSTEMS
Filed July 18, 1946
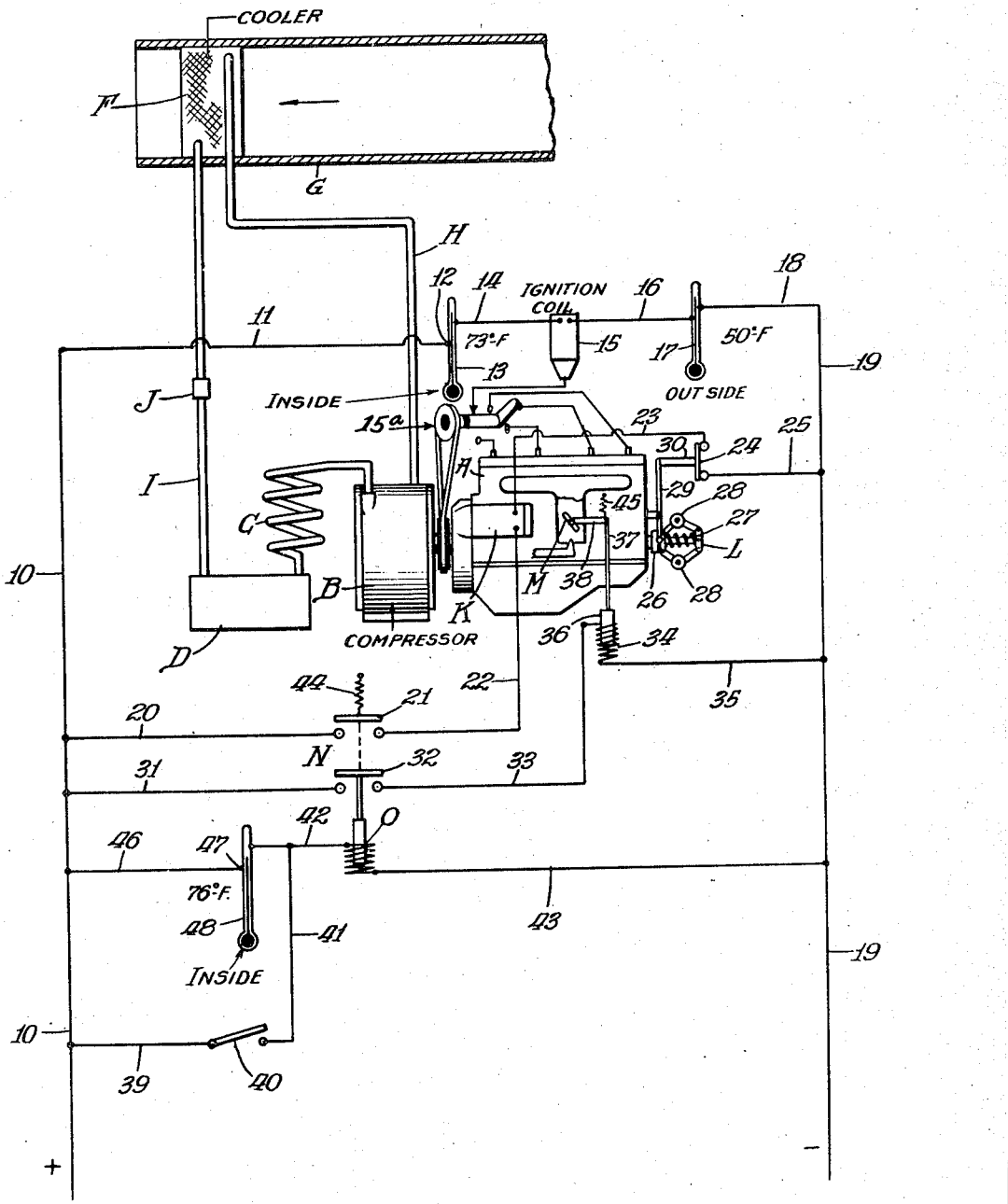
INVENTORS.
Timothy J. Lehane
Everett H. Burgess
BY
Harvey M. Gillespie  Atty.

Patented Feb. 22, 1949

2,462,514

UNITED STATES PATENT OFFICE 2,462,514

APPARATUS FOR THE CONTROL OF COOLING SYSTEMS

Timothy J. Lehane and Everett H. Burgess, Chicago, Ill., assignors, by mesne assignments, to Vapor Heating Corporation, a corporation of Delaware Application July 18, 1946, Serial No. 684,625

8 Claims. (Cl. 62—4)

1

This invention relates to an improved automatic control for cooling systems.

A principal object of the invention is to provide an improved automatic control for a cooling system in which an internal combustion engine is used as motive power to operate the system. The invention includes the provision of means for automatically controlling the starting, stopping and the operating speed of the engine, whereby the cooling function of the system may be started and thereafter increased and decreased by changing the speed of the engine in response to temperature changes within the space being cooled.

Cooling apparatus of the type herein shown are particularly suitable for use in connection with air conditioning systems of gasoline powered vehicles, but may be used in various other situations where it is desirable to control the operations of internal combustion engines in response to temperature changes.

A preferred embodiment of the invention is shown diagrammatically in the accompanying drawing.

The cooling apparatus may be described briefly as comprising an internal combustion engine A, a compressor B operated by the engine, a condenser C leading from the compressor to a collecting vessel D, the latter of which is connected with a cooling element F. The cooling element F may be of any well known construction and is preferably arranged within a conduit G so that a stream of air may be passed through the cooling element and into the space being cooled, for example the passenger space of a bus or other gasoline powered vehicle. The cooling element F is connected by a return pipe H to the inlet of the compressor B. After the coolant is compressed it is passed through the condenser C into a collecting container D. From this container the coolant flows through supply pipe I and expansion valve J to the inlet of the cooling element F.

The internal combustion engine A may be of any approved construction, but is preferably provided with an electrically energized starter K, together with a circuit breaker L for deenergizing the starter circuit when the engine develops sufficient speed to insure its continued operation. The engine is provided with a throttle valve M which is normally held in a partially closed position to maintain the operation of the engine at a low speed. However, when starting the engine, it is desirable to have the throttle in its wide open position. The invention, therefore, includes an electrically energized means for moving the throttle to its wide open position during the starting of the engine, but which immediately thereafter permits the throttle to assume its normally partially closed position unless the temperature conditions are such as to require full speed operation.

The electrical circuits for controlling the operation of the engine A and consequently, the operation of the compressor B and other operating parts associated with the cooling apparatus, comprises a circuit for energizing the ignition system of the engine, a circuit for energizing the starter K of the engine and a circuit for adjusting the position of the engine throttle M so as to vary the speed of the engine and cooling system to meet the temperature requirements of the enclosed space being cooled.

The circuit for energizing the ignition system of the engine leads from positive line 10 through wire 11 to a lower contact 12 of an inside thermostat 13 and thence through wire 14, an ignition coil 15 of the engine, wire 16, outside thermostat 17, and wire 18 to negative line 19. A distributor 15ª, of any suitable form, is interposed in the electrical wiring leading from the ignition coil 15 to the several spark plugs of the engine. The outside thermostat 17 is set to function at approximately 50° Fahrenheit and the inside thermostat 13 is constructed to function at a predetermined temperature, for example, 73° Fahrenheit. It will be seen, therefore, that the ignition system of the engine, and consequently the cooling system as a whole, cannot be effective until the outside temperature conditions are at or above 50° Fahrenheit and the inside temperature is at or above 73° Fahrenheit.

The starter energizing circuit leads from the positive line 10 through wire 20, the upper contact 21 of relay N, wire 22, through the starter K, and thence through wire 23 and closed contact 24 of the automatic circuit breaker L and wire 25 to the negative line 19. The automatic circuit breaker L may be of any conventional form suitable for opening the starter energizing circuit of the engine when the engine attains sufficient speed to insure its continued operation. For purpose of illustration, the said automatic circuit breaker is illustrated as comprising a sleeve 26 which is movable horizontally on a revolvable shaft 27. A pair of weights 28, 28 are pivotally supported to the shaft 27 and to the sleeve 26 so that the centrifugal force incident to the rotation of the shaft 27 will cause the weights and said sleeve to move outwardly on the shaft 27. The sleeve 26 is connected by means of a forked lever 29 and an insulated rod 30 to the normally closed contact 24. Consequently, the outward movement of the sleeve 26 imparts an inward movement to the contact 24 and opens the starter energizing circuit. When the engine stops, the weights 28, 28 return to their lower position and the contact assumes a position to close the circuit at the contact and thereby puts it in readiness to energize the starter when the circuit is again closed through contact 21 of relay N.

The throttle adjusting circuit leads from the positive line 10 through wire 31, lower contact 32 of relay N, wire 33, solenoid 34 and wire 35 to the negative line 19. The solenoid 34 includes a movable core 36 which is connected by means of a rod 37 to an actuating arm 38 fixed to the throttle M. It will be seen, therefore, that when the throttle adjusting circuit is closed at the contact 32 of relay N, the core 36 of the solenoid will be drawn into the coil 34 and thereby move the throttle M to its fully opened position.

The relay N is energized, to simultaneously close the previously described engine starting and throttle adjusting circuits, by the energization of an actuating coil O. This coil energizing circuit leads from the positive line 10 through wire 39, a manually operated switch 40, wire 41 to wire 42, thence through the relay coil O and wire 43 to the negative line 19. The circuit just described will ordinarily be closed only momentarily to facilitate starting the engine with its throttle M wide open. As soon as the manual switch 40 is released, the coil O will be de-energized. Consequently, the relay N will move, under the tension of spring 44, to open the starter energizing circuit and also the throttle adjusting circuit, whereby the throttle is permitted to move under the action of a spring 45 to its partially closed or slow speed position.

During this low speed operation of the engine A and compressors B, the cooling mechanism will operate at a low speed adapted to normally maintain the temperature of the enclosed space below a temperature of 76° Fahrenheit. However, if the temperature increases sufficiently to close the thermostat 48, for example to 76° Fahrenheit, said thermostat functions to close an electrical energizing circuit through relay coil O and thereby actuates the relay to close the throttle adjusting circuit through the solenoid 34. The energization of this solenoid moves the throttle M to its wide open position and thereby increases the operating speed of the engine. The thermostat 48 is connected in the said throttle adjusting circuit by a wire 46 leading from the positive line to contact 47 of the thermostat 48 and wire 42 to the relay actuating coil O. The closing of the upper contact 21 of relay N while the engine is operating does not result in energizing the starter K, since the starter circuit under such conditions is held open by the automatic circuit breaker L.

From the above disclosure it will be seen that the invention provides a novel and effective control system for an internal combustion engine in connection with a cooling system, whereby the starter circuit of the engine may be closed manually at or above the functional setting of the thermostats 13 and 17 and that the starting circuit will be automatically closed by the functioning of the thermostat 48 when the inside and outside temperatures are such as to close the engine ignition circuit through both thermostats 13 and 17. It will also be seen from the above disclosure that the operation of the cooling system may be changed automatically from one operating speed to another by the making and breaking of the throttle control circuit at the thermostat 48.

We claim:

1. In combination with means for altering the temperature of an enclosed space including an internal combustion engine having an electrical ignition circuit and an electrically energized starter, of means for controlling the functioning of the temperature altering means comprising temperature responsive means interposed in the said ignition circuit to open and close said circuit, means responsive to a predetermined temperature within the enclosed space for closing an electrical energizing circuit through said starter, means operated by the engine for opening the last mentioned circuit, a throttle valve for the engine, electrically energized means for opening the throttle, and means defining an electrical energizing circuit for said throttle operating means connected through the last mentioned temperature responsive means, whereby said starter and said throttle operating means are energized simultaneously.

2. In combination with means for altering the temperature of an enclosed space including an internal combustion engine having an electrical ignition circuit, an electrically energized starter, of means for controlling the functioning of the temperature altering means comprising a thermostat responsive to a predetermined temperature of the enclosed space and a thermostat responsive to a predetermined outside temperature connected in series in the said ignition circuit, whereby the thermostats function conjointly to close the ignition circuit and each functions individually to open the same, a relay, an electrical energizing circuit for the starter connected through one movable arm of the relay, a throttle valve for the engine, an electrically energized element and an energizing circuit therefor connected through another movable arm of said relay for opening the throttle to its full open position, means for energizing the relay, whereby the starter energizing circuit and the throttle opening element are energized simultaneously, and means operated by the movement of the engine for opening the starter energizing circuit.

3. In combination with means for altering the temperature of an enclosed space including an internal combustion engine having an electrical ignition circuit, an electrically energized starter, of means for controlling the functioning of the temperature altering means comprising a thermostat responsive to a predetermined temperature of the enclosed space and a thermostat responsive to a predetermined outside temperature connected in series in the said ignition circuit, whereby the thermostats function conjointly to close the ignition circuit and each functions individually to open the same, a relay, an electrical energizing circuit for the starter connected through one movable arm of the relay, a throttle valve for the engine, an electrically energized element and an energizing circuit therefor connected through another movable arm of said relay for opening the throttle to its full open position, manually operable means for momentarily energizing the relay, whereby the starter energizing circuit and the throttle opening element are energized simultaneously, and means operated by the movement of the engine for opening the starter energizing circuit.

4. In combination with means for altering the temperature of an enclosed space including an internal combustion engine having an electrical ignition circuit, an electrically energized starter, of means for controlling the functioning of the temperature altering means comprising a thermostat responsive to a predetermined temperature of the enclosed space and a thermostat responsive to a predetermined outside temperature connected in series in the said ignition circuit, whereby the thermostats function conjointly to close the ignition circuit and each functions individually to open the same, a relay, an electrical energizing circuit for the starter connected through one movable arm of the relay, a throttle valve for the engine, an electrically energized element and an energizing circuit therefor connected through another movable arm of said relay for opening the throttle to its full open position, means responsive at a predetermined temperature of the enclosed space for energizing said relay, whereby the starter energizing circuit and the throttle opening element are energized simultaneously, and means operated by the movement of the engine for opening the starter energizing circuit.

5. In combination with an apparatus for cooling an enclosed space including an internal combustion engine for operating the apparatus, the engine being provided with an electrical ignition circuit, an electrically energized starter, and a throttle valve movable from a partially open position to full open position; of means for controlling the operation of the cooling apparatus by controlling the operation of said engine comprising a pair of thermostats set to function at different temperatures and connected in series in said ignition circuit, a relay, an electrical circuit for energizing the starter connected through one movable arm of the relay, a solenoid for moving the throttle to its full open position, an electrical energizing circuit for the solenoid connected through another arm of the relay, a thermostat responsive to a predetermined temperature of the enclosed space for energizing said relay, whereby the said engine is started and operated with full open throttle at and above the functional setting of the last mentioned thermostat and the engine is operable at lower speed at temperatures lower than said functional setting.

6. In combination with an apparatus for cooling an enclosed space including an internal combustion engine for operating the apparatus, the engine being provided with an electrical ignition circuit, an electrically energized starter, and a throttle valve movable from a partially open position to a full open position; of means for controlling the operation of the cooling apparatus by controlling the operation of said engine comprising an outside thermostat set to function at a predetermined outside temperature and an inside thermostat set to function at a predetermined inside temperature connected in series in said ignition circuit, a relay, an electrical circuit for energizing the starter connected through one movable arm of the relay, a solenoid for moving the throttle to its full open position, an electrical energizing circuit for the solenoid connected through another arm of the relay, a second inside thermostat responsive to a predetermined higher temperature than the first mentioned inside thermostat for energizing said relay, whereby the said engine is started and operated with full open throttle at and above the functional setting of the last mentioned thermostat and the engine is operable at lower speed at temperatures below the functional setting of said last thermostat.

7. In combination with an apparatus for cooling an enclosed space including an internal combustion engine for operating the apparatus, the engine being provided with an electrically energized starter and a throttle valve movable from a partially open position to its full open position, of means for controlling the operation of the apparatus by controlling the speed of operation of the engine comprising an electrically energized relay, a circuit for energizing the starter connected through one movable arm of the relay, an electrically energized device for moving the throttle to its full open position, an energizing circuit for said device connected through another arm of the relay, manually operable means for momentarily energizing said relay, whereby the engine is started while the throttle is maintained in its full open position, means effective at a predetermined speed of the engine for opening said starter energizing circuit, and means effective at a predetermined inside temperature for closing a circuit to energize said relay to close said electrical energizing circuit through said throttle moving device.

8. In combination with an apparatus for cooling an enclosed space including an internal combustion engine for operating the apparatus, said engine being provided with a throttle valve maintained normally in a partially open position and movable in opposite directions within the limits of its partially open position and its full open position, means for starting the engine, electrically energized means for moving the throttle to its full open position, and means including a thermostat responsive to a predetermined inside temperature for opening and closing an electrical energizing circuit through said throttle moving means.

TIMOTHY J. LEHANE.
EVERETT H. BURGESS.

REFERENCES CITED

The following references are of record in the file of this patent:

UNITED STATES PATENTS

| Number | Name | Date |
| --- | --- | --- |
| 1,943,317 | Hulse | Jan. 16, 1934 |
| 1,943,964 | Hulse | Jan. 16, 1934 |
| 2,187,397 | Goggins | Jan. 16, 1940 |